US012600328B2

(12) United States Patent
Pahl et al.

(10) Patent No.: US 12,600,328 B2
(45) Date of Patent: Apr. 14, 2026

(54) TRAILER VEHICLE CONTROL SYSTEM

(71) Applicant: KNORR-BREMSE Systeme fuer Nutzfahrzeuge GmbH, Munich (DE)

(72) Inventors: Stefan Pahl, Munich (DE); Matthew Fry, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 50 days.

(21) Appl. No.: 18/654,108

(22) Filed: May 3, 2024

(65) Prior Publication Data

US 2024/0367625 A1 Nov. 7, 2024

(30) Foreign Application Priority Data

May 3, 2023 (GB) ...................................... 2306517

(51) Int. Cl.
| | |
|---|---|
| B60T 7/20 | (2006.01) |
| B60T 7/22 | (2006.01) |
| B60T 17/22 | (2006.01) |

(52) U.S. Cl.
CPC ...................................... B60T 7/20 (2013.01); B60T 7/22 (2013.01); B60T 17/22 (2013.01)

(58) Field of Classification Search
CPC ..... B60T 7/20; B60T 7/22; B60T 7/16; B60T 17/22; B60T 8/1708; B60T 13/662; B60T 13/265; B60G 17/017; B60G 17/0195; B60G 17/0165; B60G 2300/04; B60G 2500/30; B60G 2800/204; B60R 25/08; B60R 25/2072; B60R 2325/308

USPC ...................................................... 701/37, 70
See application file for complete search history.

(56) References Cited

U.S. PATENT DOCUMENTS 7,586,401 B2 * 9/2009 Payne ..................... B60R 25/33
701/519
2008/0157942 A1 7/2008 Payne

FOREIGN PATENT DOCUMENTS

| EP | 2 708 389 A2 | 3/2014 |
|---|---|---|
| GB | 2499459 A | 8/2013 |
| WO | WO 2017/108201 A1 | 6/2017 |

OTHER PUBLICATIONS

European Search Report issued in European Application No. 24 17 3401 dated Aug. 29, 2024 (2 pages).

* cited by examiner

*Primary Examiner* — Hai H Huynh
(74) *Attorney, Agent, or Firm* — Crowell & Moring LLP

(57) ABSTRACT

A trailer vehicle control system has a trailer electronic brake system ECU, which ECU is configured to receive a request, via a CAN bus, from a telematics unit or from a trailer access point. The trailer vehicle control system can verify a status or position of the trailer, in particular using ramp distance control. The trailer vehicle control system can then execute an annoyance feature in response to the request when the control system has determined that the status or position of the trailer meets a defined safe condition.

9 Claims, 3 Drawing Sheets

TRAILER VEHICLE CONTROL SYSTEM

CROSS REFERENCE TO RELATED APPLICATION

This application claims priority under 35 U.S.C. § 119 from GB Patent Application No. 2306517.0, filed May 3, 2023, the entire disclosure of which is herein expressly incorporated by reference.

BACKGROUND AND SUMMARY

The invention relates to a trailer vehicle control system, in particular a control system that can facilitate communication between a user of a trailer and an owner of the trailer.

A standard operating model in the commercial vehicle industry separates the ownership of a trailer from the operation and use of the trailer. In this model, trailers are acquired in large volumes by so called leasing companies who then lease the trailers to typically smaller corporate operators or individuals for specified periods time in return for regular payments from the operator. There are numerous different types of financial models underpinning this arrangement.

Outside of the large fleet operators, it is very common that commercial vehicle drivers will be self-employed and will work for a number of different companies. It is therefore common practice that individual trailers will be connected to a different truck after every use or several uses.

The companies that lease trailers from leasing companies operate on very thin margins and often experience cash flow difficulties. Late or non payment of leasing invoices to the leasing companies is therefore a common problem, which results in increased costs to the entire industry as leasing companies demand higher margins to offset the costs of late or non-payment of their invoices. This problem arises as the trailer owners do not have any technical control over the trailer apart from use of anti-theft solutions to disable the trailer but which could lead to a legal claim from the trailer operator. The trailer owner therefore resorts to financial means or has to use legal means to address the problem.

WO2017108201A1 discloses a system for the approach maneuvers of a motor vehicle to a dock and the operations of loading and unloading goods, and regards a communication system between a control center of a loading/unloading dock for a motor vehicle that eliminates ground control personnel, avoiding potential accidents and allowing a reduction of personnel in such operations.

The present invention therefore seeks to a provide technical control means to facilitate communication between an owner of a trailer and the operator.

According to the invention there is provided a trailer vehicle control system in accordance with the features of the independent claim(s).

The concept underlying the invention is that the trailer electronic brake system ECU can provide or act as a central intelligence unit that can receive a request such as a product recall request, maintenance request or "Financial collection assistance request" coming in via the 5V CAN from a telematics unit or a trailer access point such as iTAP®. It can then use a second technical system on the Trailer to verify the status in which the Trailer currently is and would execute an annoyance feature such as a "customer annoyance request" when the situation allows it, when the trailer is in a defined condition or situation. A preferred predefined safe condition or situation is when a ramp distance control RDC feature is active as when RDC is active, the trailer will be in a safe position and not on the highway.

Instead of just using a braking system intervention, the solution of the invention advantageously does not create safety critical situations in a public traffic environment. Unlike anti-theft solutions in the market, the trailer should preferably not be permanently disabled which could trigger a claim from the trailer operator.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
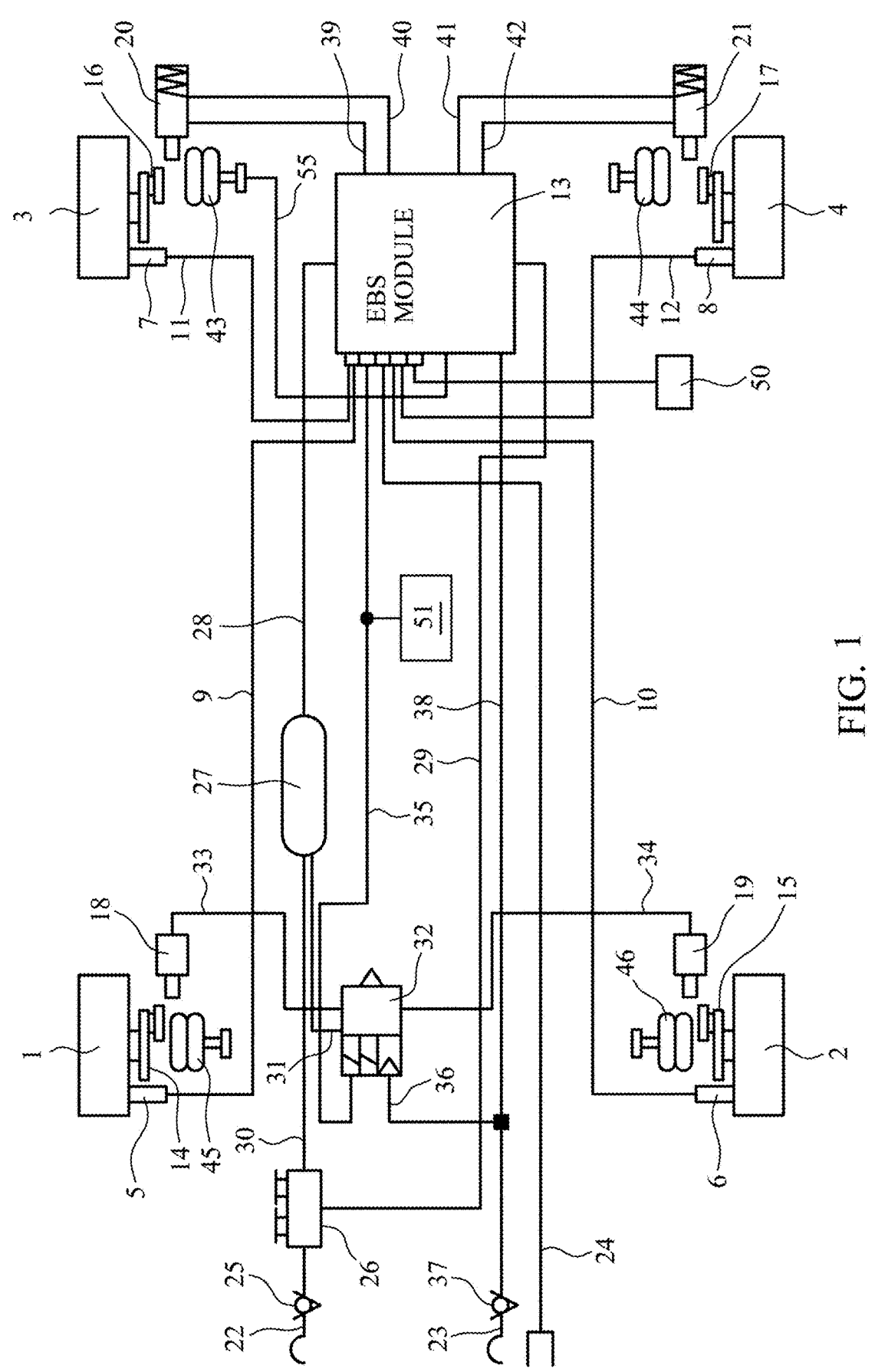
FIG. 1 shows a trailer electronic braking system.

FIG. 1 shows a trailer electronic braking system in which the utility vehicle trailer has a steerable front axle with front wheels 1, 2 and a rear axle with rear wheels 3, 4. Rotational wheel speed sensors 5-8 are in each case assigned to the front wheels 1, 2 and the rear wheels 3, 4, and are connected by way of electric lines 9-12 with an electropneumatic brake pressure control module 13 (EBS module) which is primarily assigned to the rear axle brakes. One brake 14-17 is in each case assigned to the front wheels 1, 2 and the rear wheels 3, 4, which brake 14-17 can be applied by means of brake cylinders 18, 19 of the front axle or spring-loaded brake cylinders 20, 21 of the rear axle.

The braking system of the trailer vehicle can be connected by way of three connections, specifically a pneumatic supply line connection 22, a pneumatic control line connection 23 and an electric control connection 24, with the braking system of a tractor or a further trailer. The electric control line 24 provides the ISO 11992 CAN data connection.

The supply line connection 22 is connected by way of a return valve 25 and a parking valve 26 with an air brake reservoir 27. From the air brake reservoir 27, a pneumatic line 28, 30 leads to a supply input of the pressure control module 13 and ABS valve 32. In addition, a pneumatic line 29 branches off the parking valve 26 to the pressure control module 13. A pneumatic line 30 extends between the parking valve 26 and the air brake reservoir 27.

The ABS valve 32 is assigned jointly to both brake cylinders 18, 19 of the front axle and is connected with the brake cylinder 18 by way of a pneumatic line 33 and with the brake cylinder 19 by way of a pneumatic line 34. The ABS valve 32 has two electric control inputs which are connected by way of "one" electric line 35 shown here only schematically with the pressure control module 13.

Furthermore, the ABS valve 32 has a pneumatic control input 36 which is connected by way of a return valve 37 with the pneumatic control connection 23. The pneumatic control input 36 is also connected by way of a pneumatic control line 38 with a pneumatic control input of the pressure control module 13. The pressure control module 13 has an integrated pressure sensor (not shown) which measures the pressure in the pneumatic control line 38, that is, the control pressure present at the pneumatic control input 36 of the ABS valve, which control pressure is identical to the maximal pressure which can be controlled into the brake cylinders 18, 19.

The pressure control module 13 has pneumatic outputs 39-42 which are connected by way of assigned pneumatic lines with the spring brake cylinders 20 or 21.

Furthermore, pneumatic axle load sensors or air bellows 43, 44 are provided at the rear axle and permit a determination of the axle load, particularly of the dynamic axle load during braking and starting. The axle load sensors or air bellows 43, 44 are connected by way of pneumatic lines with the pressure control module 13. Correspondingly the pressure in airbags 45, 46 provided at the front axle, which here are electrically controlled, may be detected by the transducer 47. However, the axle load sensors 45,46 are not absolutely necessary.

To provide stability control, a lateral acceleration sensor 50 is provided, which may also be integrated with a yaw sensor, and the output of the lateral acceleration sensor is fed to the pressure control module/ECU 13. Typically the lateral acceleration sensor 50 is integrated into the pressure control module/ECU 13. In the event that lateral acceleration on the trailer is detected, the pressure control module can provide for increased brake force at the front and/or rear axles. When the lateral acceleration sensor 50 detects lateral acceleration on the trailer in which it is installed, the sensor generates a signal setting the stability control to active.

With respect to the embodiment described with respect to FIG. 1, the ABS valve 32 may be replaced with an electro-pneumatic valve where the electric control line 35 consists of a commutation means preferably CAN and an electric power source.

The pressure control module 13 receives data from the wheel speed sensors on the trailer and also receives a signal indicating whether the brake pedal in the vehicle cab is depressed or not, as well as the brake pressure demand. In addition to the ISO 7638 electrical connection shown, trailers can also have an ISO 1185 electrical connection for supplying power to indicator lights and the trailer stop lights.

Figure 2:
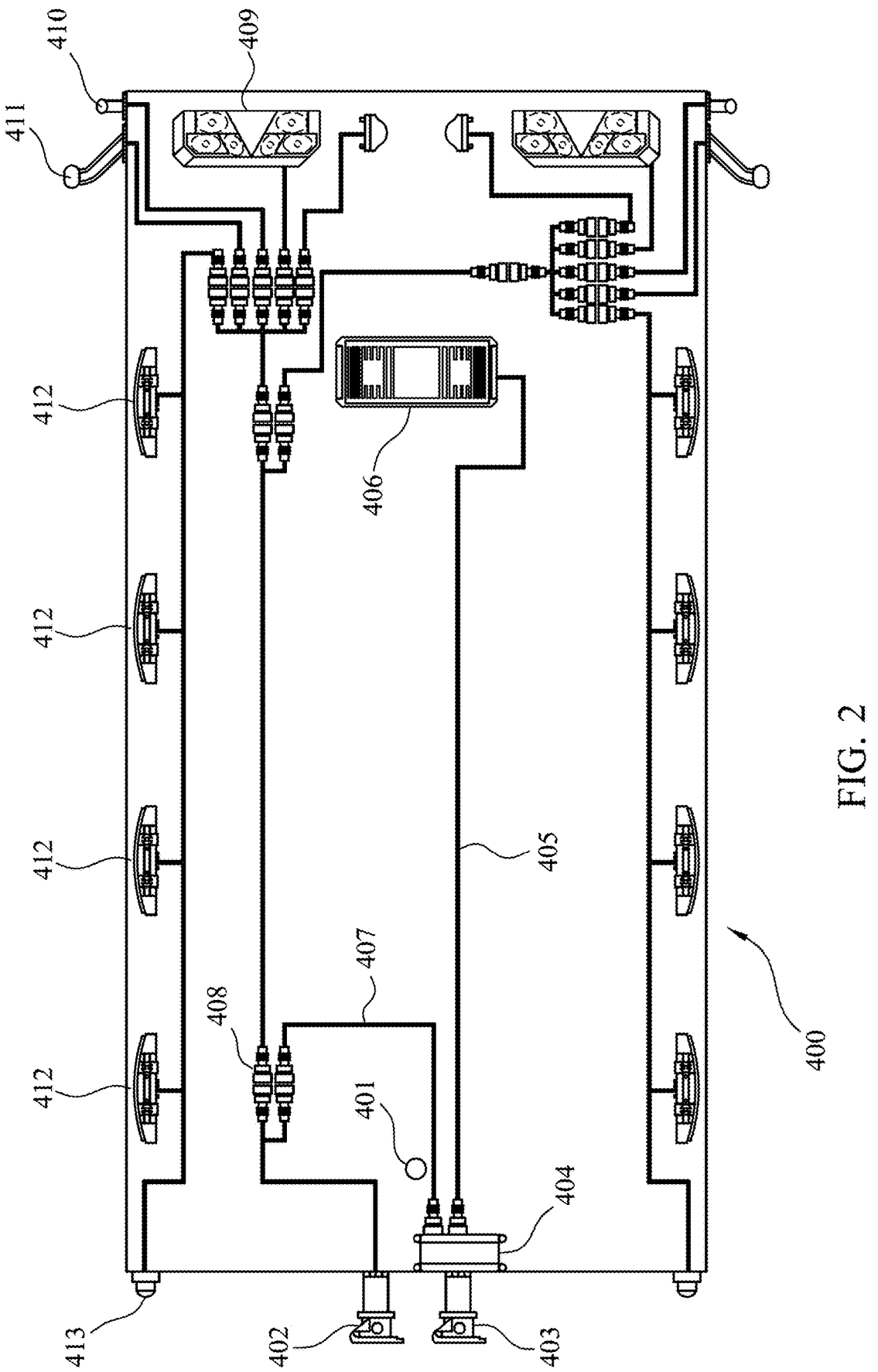
FIG. 2 shows schematically the electrical connection in a further embodiment of the invention.

A ramp docking sensor 60 is provided, which is electrically connected to the pressure control module ECU 13 either directly or via CAN bus 24, In an alternative installation of the braking system shown schematically in FIG. 2 in a trailer 400. The front end of the trailer, denoted by kingpin 401, is provided with a separate ISO 12098 connector 402 and ISO 7638 connector 403. The ISO 7638 connector 403 is provided with an electronic control unit 404. The electronic control unit 404 is connected by way of an electrical and CAN bus connection 405 to the trailer EBS 406 and by way of electrical connection 407 to a splitter 408, which is also connected to the ISO12098 connector 402 and which provides the connection to the trailer lighting system. The trailer lighting system The trailer lighting system, which is symmetrically arranged on the trailer, comprises rear light clusters 409, which clusters include the brake, reversing and night lights, top 410 and bottom 411 rear marker lights, four side marker lights 412 and a front marker light 413 the system is provided with the ISO 7638 and, optionally, ISO 1185 (or alternately ISO12098) connections being connected to an electronic control module. The electronic control module can be located at the trailer headboard and receive the brake and running gear control signals from the Truck-Trailer CAN bus. The trailer electronic module is further connected to a first trailer brake CAN bus, to which the trailer brake module (equivalent to EBS module 13) is connected The trailer brake module is further connected to wheel speed sensors and Auxiliary I/O.

In this embodiment, the trailer is provided with an internal CAN bus, in particular a 5V CAN bus, to enable auxiliary devices or functions to be installed including a ramp docking sensor as well as devices such as a trailer information module, tire pressure monitoring system or trailer access point. The internal bus is connected to the trailer electronic pressure module.

The ISO 11992 standard defines a maximum speed on the bus at 125 Kb/s as the signal on that CAN bus has a range from 0 to the truck battery voltage. As trailers are disconnected and reconnected frequently, there is inevitably damage to the connectors resulting in attenuation of the voltage. On the known systems, a 5V CAN bus is unsuitable for connection to a truck due to this damage as the signal will be attenuated from too low a level to provide a reliable signal over the life time of the system.

The connection between the electronic control module and the module and is however permanent upon installation. The absence of any connection damage leads to much reduced signal attenuation on the CAN bus connections so the 5V CAN bus can be used. Moreover, the speed of the data signals on this CAN bus can also be increased to 250 Kb/s or higher, which in turn enables much more data to be placed on the CAN bus. This enables the introduction of further functionality on the trailer such as obstruction detection or lane control.

The trailer internal CAN bus enables further auxiliary devices or functions to be installed such as a trailer information module, tire pressure monitoring system or trailer access point such as that disclosed in GB2499459. The trailer internal bus is connected to the electronic control module. The Trailer EBS 13, 404, 406 is then provided with a trailer access point or microcontroller that has an interface feature to enable a connection to a smart device to be established. This can be either wirelessly or via the vehicle CAN bus or powerline.

The electronic control module comprises a power management function, the CAN bus connections and the warning light circuit connection. The control logic for the trailer brake system is located in this module rather than in the brake control module.

Figure 3:
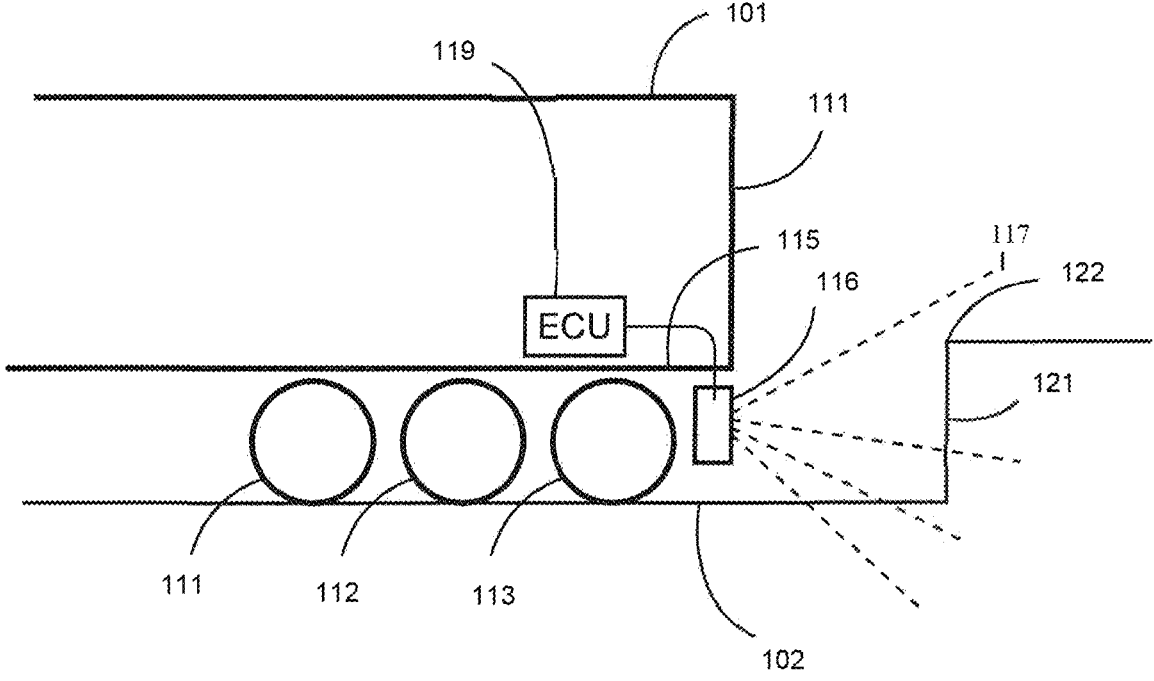
FIG. 3 shows schematically an implementation of a ramp docking control.

FIG. 3 shows a vehicle 101 comprising a rear end 111 that represents the vehicle's furthest rear extension in a longitudinal direction. The vehicle 101 is shown with three axles 112, 113, 114. Although the embodiment exhibits the first, the second and the third rear axle, the invention is also applicable to vehicles comprising only one rear axle or a first and a second rear axle.

The height of the vehicle is adjustable by controlling the air pressure into airbags on each of the rear axles. The height can be controlled either by means of a simple raise/lower valve or alternatively under the control of the pressure control module ECU 13 or by means of an electronic levelling control system. The height of the vehicle is usually changed so that the cargo hold floor 115 is level with the cargo dock as this greatly speeds up the loading and unloading of the vehicle.

The vehicle 101 further comprises a ramp docking sensor 116. In the embodiment, the ramp docking sensor 116 is a radar sensor. However other sensors, e.g. a LIDAR-sensor, are applicable. Particularly, any sensor is applicable that provides not only distance information but also direction information towards an obstacle, eg ultrasonics. The ramp docking sensor 116 is configured such that it fulfils its function as a regular ramp docking sensor as known from the related art. It provides distance information and/or direction information with respect to a loading ramp 121. Further, the ramp docking sensor 116 is configured such that it detects— by means of a hypothetical scanning range 117—the height of a ramp sill 122 of the loading ramp 121.

In addition to the ramp docking sensor, there may be an additional conventional height level sensor (not shown in the figures) that detects a vertical distance between the ground level 102 and the conventional height level sensor of the vehicle 101. Conversely, the ramp docking sensor 116 may determine the height level of the vehicle and serve as backup sensor of the height level sensor. The ramp docking sensor 116 also may serve as the only height level sensor.

The ramp docking sensor may also determine presence of obstacles and hence may serve as an obstacle avoidance sensor for all obstacles in its scanning range.

In the embodiment of FIG. 3, the ramp docking sensor 116 is arranged at the rear end 111 of the vehicle 101. It is further arranged in an area between 0.2 to 1.5 m above the ground level 102. It is further arranged in an area of 0.3 m left and right to the center line of the vehicle 101. The ramp docking sensor is oriented backwards at an angle of 10° downwards.

The sensor is connected to an electronic control unit 119 (ECU) typically via the CAN bus. ECU 119 performs evaluation of the sensor signals and determines position and distance of the loading ramp 121, height of the loading ramp sill 122 and height of the vehicle cargo hold floor 115. The latter is determined by the distance between the ground level and the ramp docking sensor 116 corrected by a height difference of the sensor relative to the cargo hold floor 115 that is known to the ECU. Based on that determination, the ECU automatically adapts the level of the cargo hold floor 115 with respect to the level of the loading ramp sill 122 by initiating an alteration of the pressure in the vehicle's 101 pneumatic suspension.

In a first implementation the trailer electronic braking system is provided with a communication channel to a telematics unit, e.g. via a 5V CAN connection. In addition the trailer is fitted with the radar based ramp dock control system described above. This ramp dock control system is connected to the trailer electronic braking system on the same or a second 5V CAN connection as the telematics, so that the trailer electronic braking system can make a decision to brake the trailer based on input coming from the ramp dock control system.

In an alternative implementation, the trailer has an electronic air suspension system, with which the request can be undertaken.

The trailer electronic braking system then receives the request such as a recall request, maintenance request or "Financial collection assistance request" from the telematics via the 5V CAN connection. It would then switch into a pre trigger or "observation mode" which could even last over more than one ignition cycle. By keeping this pre trigger or "observation mode" active over more than one ignition cycle the Trailer would not need to get a repeated "customer annoyance request" after the driver has cycled the ignition which is typically the case with most of the auxiliary functions. The pre trigger or observation mode prevents the driver from disabling the telematics system to prevent the annoyance feature from working.

The trailer electronic braking system would then wait for the ramp docking control system to become active. The sequence after initialization of the ramp docking control needs to be observed to identify a dock approaching sequence which would tell the trailer electronic braking system that the vehicle is in an environment where an annoyance request would not create any safety critical situation.

The annoyance request could be performed in one of the following ways:

The Trailer could get reversed to the dock and then get braked permanently so that the driver cannot leave the dock for a predetermined (programmable) time period. This would cause some logistics issues since the dock would be blocked and could not be used for the next vehicle.

The Trailer could get permanently braked when a predefined distance to the dock has been reached (e.g. 1 m) so that the vehicle cannot approach the dock and therefore cannot get unloaded easily.

The Trailer could get braked in a certain way so that the docking procedure would take a longer time than usual.

The Trailer suspension could get lowered down to the bump stops so that the Trailer cannot get unloaded and that the Driver would have no chance of manually setting the Trailer height to the desired position.

The Trailer suspension could get lifted to its maximum position so that the Trailer cannot get unloaded and that the Driver would have no chance of manually setting the Trailer height to the desired position.

It would be possible to use on board data such as the tire pressure or brake lining wear to disable the trailer via the trailer brake system.

Or it could be realized as a combination out of two or more of the above described possibilities.

The annoyance request could then be cleared by the same route as the feature was actuated. The trailer GPS/GSM, if installed, could perform a transaction with the owner server to prevent a diagnostic tool resetting the annoyance feature, The advantage of using such a request procedure is that the vehicle owner obtains a possibility to remotely influence the usability of the Trailer and therefore would be given an opportunity to claim the payment of the invoices for the rental Trailer.

At this time, the standards in force are ISO 1185:2003 ISO 7638-1/2:2018, ISO 11992:2021, ISO12098:2020 and SAE 560:2020.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A trailer vehicle control system, comprising:
a trailer electronic brake system ECU of a trailer, which ECU is configured to receive a request, via a CAN bus, from a telematics unit or from a trailer access point, wherein
the trailer vehicle control system verifies a status or position of the trailer, and
the trailer vehicle control system executes an annoyance feature in response to the request when the trailer electronic brake system has determined that the status or the position of the trailer meets a defined safe condition.

2. The trailer vehicle control system according to claim 1, wherein
the trailer comprises a ramp distance control RDC system, and
the vehicle control system executes the annoyance feature when the RDC system is active.

3. The trailer vehicle control system according to claim 1, wherein the annoyance feature comprises an application of brakes of the trailer for a predetermined time interval by the trailer electronic brake system ECU.

4. The trailer vehicle control system according to claim 1, wherein the annoyance feature comprises an application of brakes of the trailer when a trailer position is determined as being within a predefined distance of a dock.

5. The trailer vehicle control system according to claim 1, wherein the trailer comprises a suspension, and the annoyance feature comprises lowering or raising a trailer height.

6. The trailer vehicle control system according to claim 1, wherein the trailer is lowered to bump stops of the trailer.

7. The trailer vehicle control system according to claim 1, wherein the trailer is raised to its maximum height.

8. The trailer vehicle control system according to claim 1, wherein the trailer is disabled using on-board data.

9. The trailer vehicle control system according to claim 8, wherein the on-board data comprises a tire pressure or an amount of brake lining wear.

* * * * *